Dec. 26, 1939.  H. SAUER  2,185,018
POLARIZING STRUCTURE
Filed Dec. 30, 1937
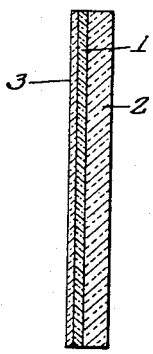
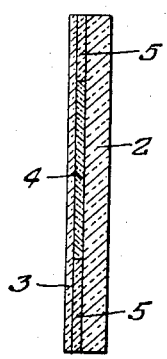
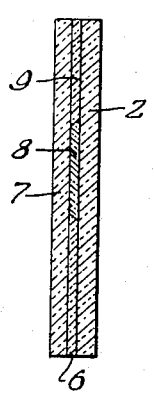
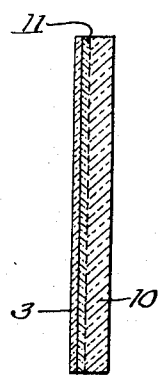
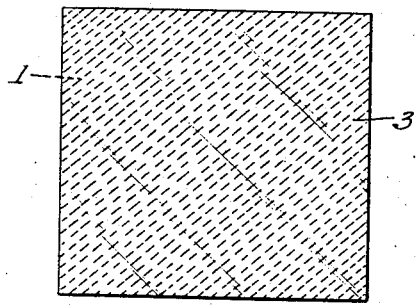
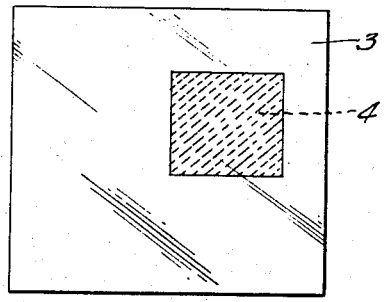
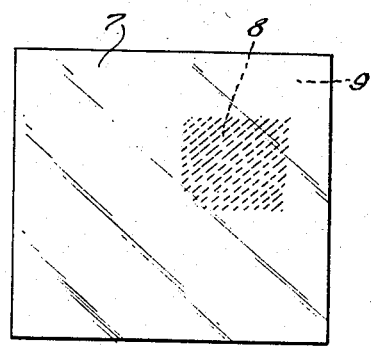
Inventor
Hans Sauer
by B. Singer
Atty.

Patented Dec. 26, 1939

2,185,018

UNITED STATES PATENT OFFICE 2,185,018

POLARIZING STRUCTURE

Hans Sauer, Dresden, Germany, assignor to Zeiss Ikon Aktiengesellschaft, Dresden, Germany Application December 30, 1937, Serial No. 182,497
In Germany December 31, 1936

1 Claim. (Cl. 88—65)

This invention relates to improvements in polarizing structures.

The invention particularly relates to improvements in polarizing structures of that type which is applied to windows or to windshields of vehicles and the like.

It is an object of the invention to facilitate the application as well as the maintenance of the polarizing agent on the transparent base with which it is to be united.

Another object of the invention is to apply the polarizing material in the form of a filmlike layer or foil to the base by binding it to the base through partial fusion or solution, whereby the union between the base and polarizing filmlike layer is greatly strengthened.

Another object of the invention is to provide a protective layer for the polarizing film or foil to retain the same tightly against the surface of the base and to prevent the atmospheric influence from causing a separation of the elements of the structure.

The invention also has the object of applying the filmlike layer or foil of polarizing material over a portion only of the area of the base and to protect the polarizing foil against the influence of the atmosphere, while at the same time maintaining uniform thickness of the entire structure even at that portion at which the base is not covered by the polarizing film.

It is furthermore an object of the invention to provide a polarizing structure in which the polarizing material in the form of a film or foil is utilized as a bond between two transparent panes of normally shatterable material, whereby owing to the insertion of the non-shatterable polarizing film between the shatterable panes, the entire structure is converted into a non-shatterable structure of the type of the safety glass, at present generally employed in automobiles and for other purposes.

With these and numerous other objects in view, several embodiments of the invention are illustrated in the accompanying drawing to which reference is made in the following specification without, however, thereby limiting the invention solely to the embodiments illustrated and described herein.

In the drawing:

Fig. 1 is a diagrammatic cross-sectional view of a polarizing structure, illustrating a base, a polarizing foil and protective layer;

Fig. 2 is a similar diagrammatic cross-section of a polarizing structure comprising a base which is covered over a portion of its area only with the polarizing foil, while a protective layer is applied over the entire area;

Fig. 3 is a similar cross-sectional diagrammatic view of an embodiment of the invention showing a polarizing film sandwiched between panes of shatterable material;

Fig. 4 is a similar cross-sectional view of a polarizing structure having a base to which the polarizing material is joined by fusion or solution;

Fig. 5 illustrates diagrammatically a front elevation of the embodiment illustrated in Fig. 1 or 3, and the areal extent of the polarizing film being indicated by dotted diagonal lines;

Fig. 6 is a similar diagrammatic front elevation of a polarizing structure of the type shown in Fig. 2, and Fig. 7 is another front elevation of a modified embodiment of the invention to illustrate the gradual merger of the polarizing layer into a non-polarizing layer surrounding the former.

In the window construction as well as in the construction of windshields for automobiles and the like where it has been desired to eliminate the disturbing effect of light reflection, it had been proposed heretofore to apply a layer of polarizing material usually in the form of a foil to a transparent base. Material of this character is now well known in the art, and may be designated as dichroitic crystalline material.

In order to protect the polarizing layer against the detrimental influences of the atmosphere, it had been proposed heretofore to apply this layer or foil on the inner face of a transparent base, as for instance, a base of glass or highly transparent synthetic resinous material. This application of the polarizing foil on the surface of the base directed away from the light which is to be polarized has the disadvantage that the rays of light before encountering the polarizing foil suffer deflection or fractionation through the transparent base through which they have to pass. In order to eliminate this defect, it also had been proposed to apply the polarizing foil to the outside of the transparent base or to that face which is directed towards the light so as not to interfere with the polarizing effect of the filtering layer by the double fractionation of the light induced by the base.

This application of the polarizing filter to the upper surface of the base, however, exposes the filter itself to the atmosphere, and where the polarizing filter is applied to a windshield, the filter is particularly influenced by the dust or grit stored up by the vehicle. It is also detrimentally affected by the movement of the windshield wiper, etc.

The present invention provides a polarizing structure of this type in which the polarizing filter 1, Fig. 1, is applied to the transparent base 2 in a known way, as for instance, by a suitable adhesive or in some other preferred way, and it is then covered on the outside by an additional transparent protective layer 3 likewise made of transparent material. This protective layer may be a thin layer of solid transparent sheet material which will readily unite with the polarizing filter, or it may be produced in the form of a coating which prior to its application is of liquid consistency and which readily hardens after having been spread over the polarizing filter in the form of a thin film.

While in Fig. 1 as well as in Fig. 5 the polarizing filter 1 is shown as being coextensive with the area of the base, it is obvious that this foil of polarizing material may be applied to a smaller portion of the base, as for instance, to that area thereof which is directly in front of the driver, as indicated at 4 in Fig. 6, and that the protective layer 3 may then be extended over the entire area of the base 2 to seal the edges of the polarizing foil against the atmospheric influences.

The thickness of the structure in the last named case would then be different over that area portion over which the polarizing filter 4 is applied from that portion over which this polarizing filter does not extend. Fig 2 illustrates diagrammatically in cross-section an embodiment in which in spite of the application of a polarizing filter 4 over an area portion only of the base 2, the entire structure may have uniform thickness throughout. In this embodiment of the invention, an intermediate layer 5 of transparent material is directly applied to the base 2 on the outer surface thereof, said transparent intermediate layer leaving, however, uncovered an area portion of the base 2. The layer 5, for instance, might first be applied to cover the entire area of the base, and after having been applied, an area of the selected size may be cut out from the applied intermediate layer 5 and the polarizing filter 4 may be applied in the cut out portion of the intermediate layer.

The protective layer 3 may then extend over the entire area of the structure, and may thereby guard the polarizing filter 4 as well as the intermediate layer 5 surrounding said filter against the obnoxious influence of the atmosphere.

In the embodiment illustrated in Fig. 3, the base 2 again is covered with a layer 6 which extends over the entire area of said base. Where this base is made of glass or some other shatterable material, the protective element 7 also may be produced of some shatterable substance, as for instance, another similar pane of glass, and owing to the provision of a cementitious layer 6 of non-shatterable material between these two outer elements, the entire structure will be converted into a non-shatterable structure. The intermediate layer 6 which cements the two glass panes together may be of polarizing effect over the entire area, as indicated at 1 in Fig. 1. It may also, however, be made of a non-polarizing transparent material which is rendered suitable for polarizing incoming light over a predetermined area portion only. This conversion of the transparent layer 6 over a predetermined area portion thereof into a polarizing filter may for instance be effected by applying to that portion of the transparent base 2 which is to be made light polarizing a coat 8 having the dichroitic crystalline material embedded therein and then applying to the remaining portion of the base 2 a clear coat 9, both coats 8 and 9 merging together and forming the integral layer 6.

The dispersion of this dichroitic crystalline material in the layers 1, 4 or 8 may be a uniform dispersion or if desired the crystallinic particles adjacent the marginal portions of the layers may be gradually scattered and arranged irregularly oriented as illustrated in Fig. 7 so as to merge the polarizing area 8 gradually along the margins thereof into the non-polarizing surrounding area 9 of the intermediate layer 6.

In the embodiment illustrated in Fig. 4, the base 10 may be formed by a synthetic resinous product of sufficient transparency and distinguished by the fact that it will not produce a double refraction of the light. The polarizing layer preferably is applied to the surface of the base 10 in the form of a layer of micro-crystals or in a form of a suspension in a suitable carrier which will leave the micro-crystals in the form of a thin layer upon the suspension. Where the micro-crystals are directly applied to the base 10, the polarizing layer 11 is produced by heating the base 10 during or after the spreading of the dichroitic crystals upon its surface. It is also feasible to apply a solvent to the surface of the base 10 to dissolve an extremely thin zone on the surface of said base and to embed the crystallinic material within said zone. In case the polarizing material is applied in the form of a suspension, the suspension fluid may at the same time act as a binder for retaining the polarizing material in the form of a foil or layer upon the surface. This layer may be spread again over the entire area of the base or a portion of the same only to produce a structure, for instance, as shown in Figs. 5 or 6, and where desired, the polarizing layer 11 may again be covered by a protective layer 3 or the like.

I claim:

A polarizing structure comprising a base of transparent material, a foil of transparent material applied to one surface of said base and covering the entire area of the same, a portion of said foil located within the outline of the same being adapted to polarize light passing therethrough, the polarizing portion of the foil merging with decreasing polarizing effect into the surrounding non-polarizing area of the foil.

HANS SAUER.